United States Patent [19]
Hluchan

[11] 3,946,615
[45] Mar. 30, 1976

[54] PRESSURE TRANSDUCER

[75] Inventor: Stephen Andrew Hluchan, Riverside, Calif.

[73] Assignee: Bourns, Inc., Riverside, Calif.

[22] Filed: June 9, 1975

[21] Appl. No.: 585,277

[52] U.S. Cl.................................. 73/398 R; 336/30
[51] Int. Cl.².............................................. G01L 9/10
[58] Field of Search...... 73/407 R, 398 R, 384, 182, 73/4 R, 179; 336/30

[56] References Cited
UNITED STATES PATENTS

| | | | |
|---|---|---|---|
| 3,537,308 | 11/1970 | Darlington | 73/386 |
| 3,625,116 | 12/1971 | Hluchan | 73/406 |

*Primary Examiner*—Donald O. Woodiel
*Attorney, Agent, or Firm*—Richard S. Koppel; William G. Becker

[57] ABSTRACT

A pressure transducer having a substantially linear output signal with respect to a given phenomenon of interest, which in turn is a non-linear function of a pressure differential. An interior chamber in a housing is divided into compartments by a thin, flexible, magnetically permeable diaphragm. Stationary reactance elements are positioned on opposite sides of the diaphragm at approximate gap distances therefrom (with the diaphragm unflexed) of from 0.25 mm to 4.0 mm for one element and from 0.05 mm to 0.8 mm for the other, the ratio of the gap for one element to the gap for the other element being at least 2:1. The diaphragm flexes when a pressure differential representing the phenomenon of interest is applied across it, and thereby changes the reactive coupling with each of the reactance elements. By an appropriate selection of gap distances within the above stated ranges, a steady state signal applied to the reactance elements will produce an output that varies substantially linearly with respect to variations in the phenomenon of interest.

In a particular embodiment the reactance elements each comprise inductance coils having primary and secondary windings, the primary windings being connected in a series circuit with input terminals and the secondary windings connected in a series circuit with output terminals. Appropriate gap distances for an airspeed indicator and for an altimeter are described as representative applications of the invention.

14 Claims, 6 Drawing Figures

PRESSURE TRANSDUCER

BACKGROUND OF THE INVENTION

This invention relates to pressure transducers, and more particularly to pressure transducers having a flexible magnetically permeable diaphragm reactively coupled to stationary reactance elements, the degree of coupling being determined by the position of the diaphragm.

It is well known that numerous physical phenomena can be represented by sets of pressure differentials, changes in the value of a particular phenomenon being indicated by a change in the differential between either two variable pressures, or by a change in the differential between a variable and a reference pressure. In many cases the representative pressure differential varies non-linearly with changes in the particular phenomenon of interest, requiring a conversion from a pressure differential reading when a direct indication of the phenomenon is desired. For example, airspeed may be measured by a sensing device such as a Pitot tube arrangement which obtains a pressure differential between incoming and outgoing fluid streams. The resulting pressure differential, however, varies non-linearly with airspeed, necessitating the introduction of a compensating mechanism if a linearized airspeed output is desired. In the case of an altimeter, the change in the absolute pressure exerted by the ambient atmosphere as altitude above the surface of the earth increases is exponentially related to the altitude. The measurement of altitude therefore involves the measurement of the differential between a non-linearly related variable pressure and a reference pressure.

Many data dependent devices such as air data modules, computers, and flight control units require information on altitude, airspeed, or the like in linear form in order to provide "MACH Number" indications or to perform control functions. The thrust of much of the prior art, however, has been directed toward the development of sensor mechanisms having non-linearized outputs which track variations in the input pressures as directly as possible. For example, a number of variable reactance mechanisms have been designed in which a diaphragm is positioned equidistantly between a pair of inductance coils. When a representative pressure differential is applied across the diaphragm, small deflections of the diaphragm result which in turn change the magnetic coupling between the diaphragm and each of the coils, the net effect being an electrical output that varies substantially linearly with the input pressure differential. If a linear representation of the phenomenon of interest is ultimately desired, rather than the pressure differential itself, additional electronic equipment must be provided in order to modify the output signal, thereby increasing the cost of the transducer.

An additional limitation associated with the prior art is the frequent use of flat diaphragms and the attachment of same to the transducer housing by machining at the diaphragm edges. This method of support generally requires a thicker diaphragm for structural reasons than is necessary to satisfy the magnetic requirements of the transducer. Such diaphragms, typically about 2.5 mm in thickness, may exhibit less flexibility than could be achieved with a thinner material.

SUMMARY OF THE INVENTION

In view of the above stated problems encountered in the prior art, the principal object of the present invention is the provision of a novel and improved pressure transducer capable of producing an output that varies substantially linearly with respect to a phenomenon of interest that is in turn a non-linear function of a pressure differential.

Another object is the provision of a novel and improved pressure transducer having a linearized output provided solely by a reactance circuit which comprises a flexible magnetically permeable diaphragm and stationary reactance means which are reactively coupled to the diaphragm, without a need for auxiliary linearizing circuitry.

A further object is the provision of a novel and improved variable reactance pressure transducer having an improved diaphragm construction.

In the accomplishment of these and other objects, the present invention provides a pressure transducer in which a pair of stationary reactance means are disposed in mutually spaced opposition in an interior chamber of a housing. A flexible diaphragm formed from a magnetically permeable material is anchored within the chamber between the reactance means, the gap separating the diaphragm from one of the reactance means being at least twice as great as the gap between the diaphragm and the other reactance means. The chamber communicates with the exterior of the housing to receive a pressure differential across the diaphragm which is representative of a phenomenon of interest that in turn is a non-linear function of the pressure differential. A steady state input signal applied to the reactance means results in an output signal that is determined by the reactive coupling between each of the reactance means and the diaphragm. The diaphragm itself flexes under an applied pressure differential and thereby changes its reactive coupling with the reactance means. For a given phenomenon of interest, a particular set of gap dimensions can be selected such that the output signal varies substantially linearly with variations in the phenomenon.

In one embodiment each reactance means comprises an inductance coil, the gap between the diaphragm and one of the coils being in the approximate range of from 0.25 mm to 4.0 mm, and the gap between the diaphragm and the other coil being in the approximate range of from 0.05 mm to 0.8 mm. Each coil includes a primary and a secondary winding; the primary windings are connected in a series circuit with input terminals and the secondary windings are connected in a series circuit with output terminals. The signals induced in each of the secondary windings are thereby added together to produce a net output. When the diaphragm is flexed the output signal from one secondary winding increases and the output signal from the other secondary winding decreases, the net result being a substantially linearized output from the transducer.

The invention also includes a support structure for an improved diaphragm, in which the diaphragm is provided with an annular rim that is welded to a ledge formed in the chamber wall. The diaphragm is itself either a flat rolled disc or a corrugated member that includes a flat circular central portion encompassing the area of the inductance coils, and a corrugated portion between the central portion and the rim.

Representative applications of the invention include an airspeed indicator with an approximate range of from 180 to 1100 kilometers per hour, and an altimeter with an approximate range of from 0 to 25 kilometers. In the airspeed indicator the gaps between the diaphragm and each of the inductance coils (taken with the diaphragm unflexed) are approximately 2.5 mm to 0.38 mm respectively. The gaps for the altimeter, in which the chamber on one side of the diaphragm is sealed and substantially evacuated and the altitude-indicating pressure admitted to the other side of the chamber, are 1.5 mm on the evacuated side and 0.1 mm on the other side.

DESCRIPTION OF THE DRAWINGS

Further advantages and features of the invention will be apparent to those skilled in the art from the ensuing detailed description thereof, taken together with the accompanying drawings, in which.

DETAILED DESCRIPTION

Figure 1:
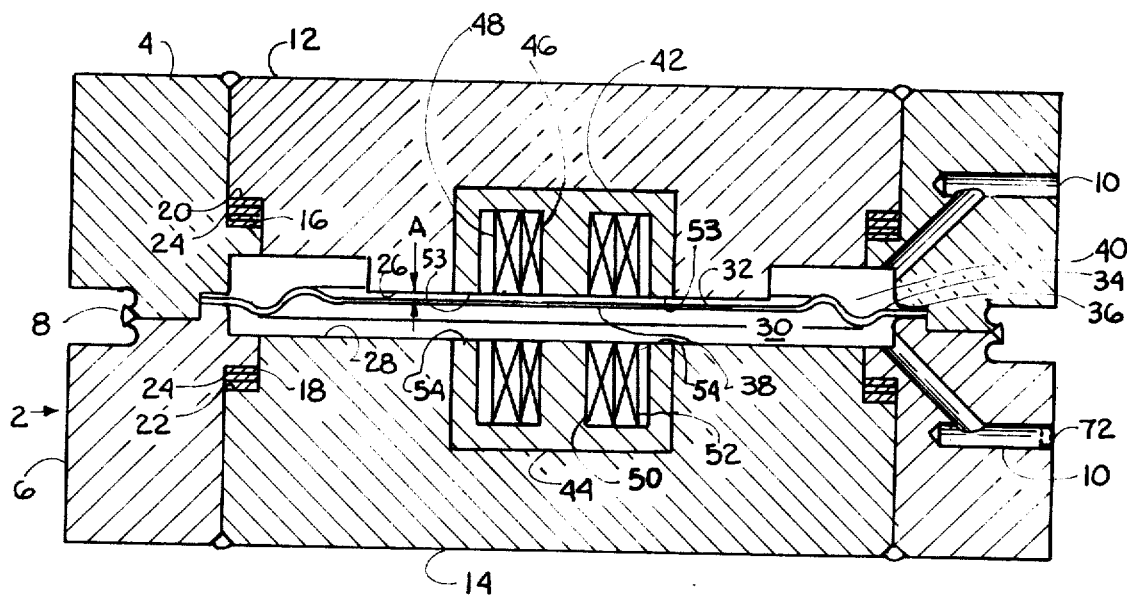
FIG. 1 is a sectional view of a pressure transducer constructed in accordance with the invention.

Referring first to FIG. 1, a pressure transducer is shown which includes a variable reactance structure capable of providing an output that is substantially linear with respect to an input phenomenon, when the phenomenon is itself a non-linear function of the pressure measured by the transducer. As will be seen, linearization is achieved by means of a particular mechanical construction, with a consequent elimination of the need for linearizing circuitry subsequent to the transducer output. The transducer includes an open-ended casing generally indicated by numeral 2 that is formed from generally cylindrical and hollow casing halves 4 and 6 cemented together end-to-end at 8. A pair of channels 10, extending from the exterior surface to the interior of the casing in the vicinity of joint 8, are bored into each casing half to provide a means for gaseous communication between the exterior and interior of the transducer.

A pair of plugs 12 and 14, formed from a metallic material such as that sold under the trade name NI-SPAN C by International Nickel Corporation, are welded in place in sockets formed by the hollow inner portions of casing halves 4 and 6. The casing halves 4 and 6 are respectively provided with outward facing annular floor portions 16 and 18 that extend around their inner circumferences in alignment with and opposed to corresponding annular ledges 20 and 22 formed about the outer circumference of plugs 12 and 14. A plurality of shims 24 are disposed between floor portion 16 and ledge 20, and between floor portion 18 and ledge 22, the number of shims selected for any particular construction being determined by the desired spacing between plugs 12 and 14 and between the plugs and their respective casing halves. As will be further explained hereinafter, the position of plugs 12 and 14 is critical in achieving linearization for any particular phenomenon of interest; the ultimate spacing will vary according to the phenomena being measured. For example, the relative position of the plugs when the transducer is employed as an airspeed indicator will not be the same as when the transducer is employed as an altimeter.

It will be noted from the drawing that the innermost surfaces 26 and 28 of plugs 12 and 14 respectively are flat and parallel, and extend across the greater portion of the casing interior. Surfaces 26 and 28 are separated by a gap, thereby forming an interior chamber 30 bounded by the two plugs and by the portion of casing halves 4 and 6 between the plugs. A flexible diaphragm 32, formed from a magnetically permeable material such as NI-SPAN C, is held in place between plugs 12 and 14, dividing chamber 30 into two mutually sealed parts. Diaphragm 32 includes an annular peripheral rim 34 that is welded to an annular ledge 36 formed on casing half 6 generally in the plane of the diaphragm. By welding the diaphragm to the casing, as opposed to machining at its edges, a technique frequently encountered in the prior art, a thinner and thereby more flexible diaphragm can be used. Diaphragm 32 further includes a flat, circular central portion 38 between and parallel to plug faces 26 and 28, and a corrugated portion 40 between rim 34 and central portion 38 to facilitate flexural movement of said central portion 38. A more detailed description of the construction of this type of diaphragm may be found in U.S. Pat. No. 3,625,116, assigned to the assignee of the present invention, the contents of which are hereby incorporated herein by reference.

Stationary reactance means comprising magnetic E-cores 42 and 44, each having a center leg and two outer legs, and associated inductance coil windings are lodged respectively in plugs 12 and 14 approximately flush with surfaces 26 and 28, thereby forming part of the boundary of chamber 30. A primary winding 46 and secondary winding 48 are respectively wound about the center outer leg of E-core 42; similar primary and secondary windings 50 and 52 are respectively wound about the center leg of E-core 44. Diaphragm 32 is reactively coupled with each of the windings to complete magnetic flux paths for each of the E-cores, the degree of coupling with each winding being determined on the basis of an inverse square law by the distance between the winding and the diaphragm. (In FIG. 1 the windings are shown as being flush with the ends of the E-core legs and with plug surfaces 26 and 28. Should the windings be set back away from the diaphragm, however, the effective distance between the diaphragm and the windings becomes the distance between the diaphragm and the E-core center legs and outer legs 53 and 54.) The degree of coupling changes as a differential pressure is applied across diaphragm 32 through channels 10 and causes the diaphragm to flex. As the diaphragm moves in response to a changing pressure differential, its reactive coupling with each of the windings increases as a winding is approached and decreases as the diaphragm recedes.

The separations or gaps between diaphragm 32 and the windings carried by E-cores 42 and 44 are designated in FIG. 1 by letters A and B, respectively. It is a critical feature of the present invention that, as opposed to prior art variable reactance transducers in which a flexible diaphragm is located equidistantly between inductance coils, diaphragm 32 is deliberately offset from the center line between the coils. While the particular spacing is determined by the application desired for the transducer, it has been found that if the ratio of B to A is at least 2:1 particular gap dimensions can be found that result in a substantially linearized output directly from the inductance coils for many phenomena that are non-linearly related to pressure differential.

Figure 2:
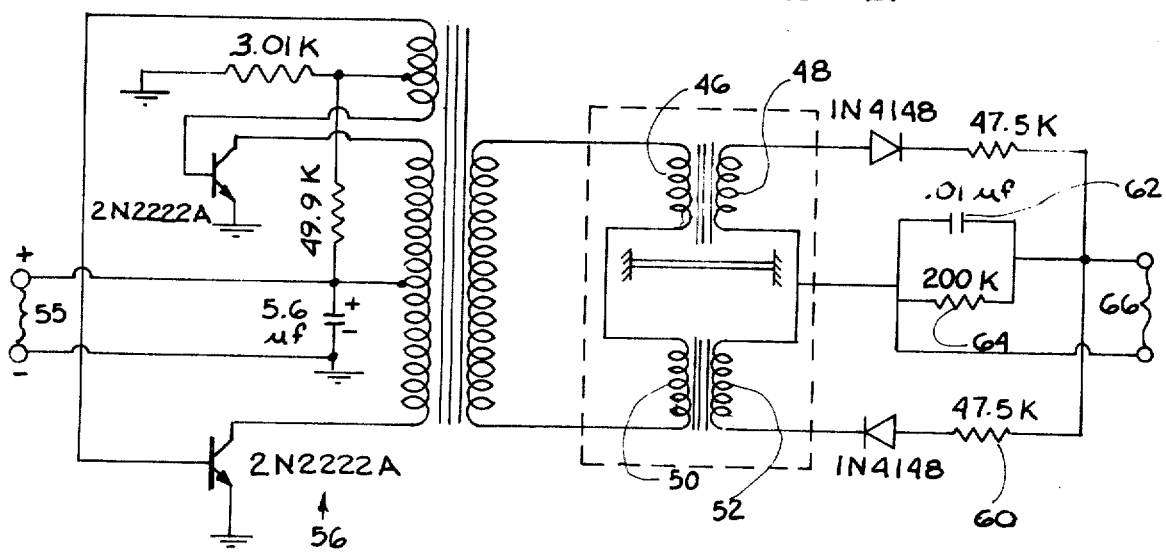
FIG. 2 is a circuit diagram of the variable reactance circuit of the transducer, together with associated input and output circuitry.

Referring now to FIG. 2, a diagram of the variable reactance circuit of FIG. 1 (shown enclosed in dashed lines) together with auxiliary input and output circuitry is shown. A pair of input terminals 55 are adapted to receive a DC signal from a suitable power source such as the electrical supply of an airplane with which the transducer is used. Terminals 55 are connected to a conventional inverter circuit 56 designed to produce a 10 kilohertz AC signal over inverter output lines 58. Primary windings 46 and 50 are connected in a series circuit with the inverter output, while secondary windings 48 and 52 are connected in a second series circuit with a half wave rectifying circuit 60 that includes an output smoothing network comprising capacitor 62 and resistor 64. A pair of output terminals 66 are connected across the smoothing network for transmittal of the linearized signal to an appropriate read-out device.

It can be seen from an inspection of FIGS. 1 and 2 that the magnetic coupling between diaphragm 32 and the windings of each E-core is dependent upon the relative position of the diaphragm, which together with the E-cores provides a flux path to magnetically link primary windings 46 and 50 respectively with secondary windings 48 and 52. The closer diaphragm 32 comes to one of the E-cores, the less is the reluctance of the flux path formed with that E-core. Of course, as the diaphragm is flexed in response to a change in pressure differential it moves away from one of the E-cores at the same rate it approaches the other. The reluctance of the flux path formed with the E-core from which the diaphragm is moving away accordingly increases but, except for the instant when diaphragm 32 is midway between the two E-cores, it does not increase at the same rate as the decrease in reluctance between the diaphragm and the E-core it approaches. It has been found that, with a proper selection of initial gap dimensions A and B, the net effect of an increase in reluctance for the flux path of one set of windings and a decrease for the other set of windings is an output at terminals 66 that is linear with respect to a phenomenon of interest which in turn is a non-linear function of the pressure differential applied across diaphragm 32. Given the aforesaid minimum gap ratio of 2:1, gap A will generally be in the range of about 0.05 to 0.8 mm, and gap B in the range of about 0.25 to 4.0 mm for applications such as airspeed indicators and altimeters.

Figure 3:
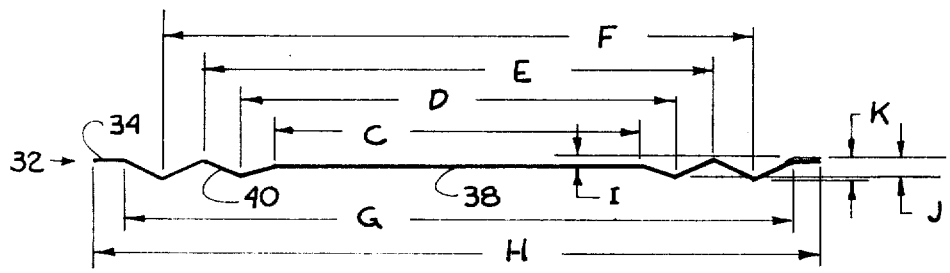
FIGS. 3 and 4 are sectional views of diaphragms suitable for use in the transducer.

Referring now to FIG. 3 for further details of a particular embodiment of diaphragm 32, the NI-SPAN C material from which the diaphragm is formed is 0.0041 inch thick and the diaphragm is characterized by the following set of dimensions, in inches, indicated in the figure:

| | | |
|---|---|---|
| C .600 | F .970 | I .010 |
| D .720 | G 1.100 | J .020 |
| E .840 | H 1.200 | K .025 |

Figure 4:
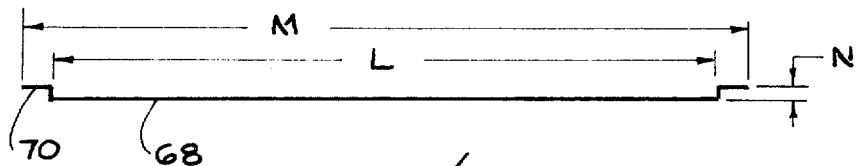

Another diaphragm suitable for use with the present invention is illustrated in FIG. 4 and comprises a flat-rolled machined disc 68 formed from a magnetic material such as 0.004 inch thick NI-SPAN C and having an annular rim 70 slightly offset from the plane of disc 68 to facilitate flexing thereof. Suitable dimensions for this embodiment are, in inches:

| | | |
|---|---|---|
| L 1.10 | M 1.20 | N .03 |

Figure 5:
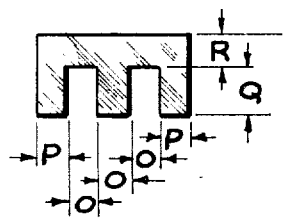
FIG. 5 is a frontal view of one lamination from a winding core suitable for use in the transducer.

Cross-sectional dimensional details of E-cores 42 and 44 are indicated in FIG. 5, each core comprising a laminated stack of layers having a total thickness of 0.08 inch. Referring to the figure, suitable dimensions are, in inches:

| | |
|---|---|
| O .125 | Q .23 |
| P .0625 | R .057 |

The particular gaps between the windings and diaphragm, the type of diaphragm employed, and the winding construction may be varied depending upon the desired function of the transducer. In one application the transducer functioned as an airspeed indicator having an approximate range of 180 to 1,100 kilometers per hour. Channels 10 were used to apply a differential pressure from a pitot tube across the corrugated diaphragm 32 shown in FIG. 3. Gap A was 0.38 mm with the diaphragm unflexed, and gap B was 2.5 mm. With a 10 volt DC signal applied at input terminals 55 and a primary : secondary turns ratio of 2:1, the output at terminals 66 was found to be substantially linearly related to airspeed within the given range.

Similar apparatus was used as an altimeter, the gap distances being adjusted so that gap A was 0.1 mm and gap B 1.5 mm with diaphragm 32 unflexed. A seal 72, indicated in dashed lines in FIG. 1, was used to block the channel 10 leading to the gap B side of diaphragm 32, this portion of chamber 30 being first substantially evacuated before sealing. When an altitude-representing pressure was introduced to the gap A side of diaphragm 32 through the other channel 10 in casing half 4 a substantially linearized output was produced.

Figure 6:
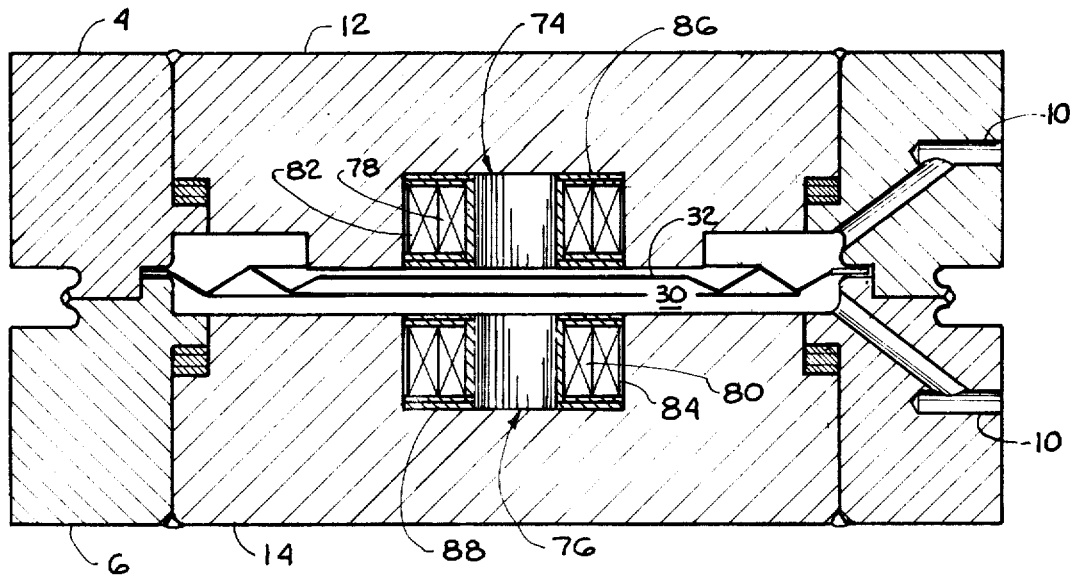
FIG. 6 is a sectional view of another embodiment of the invention.

Referring now to FIG. 6, a linearizing pressure differential transducer is shown having spool cores 74 and 76, which are generally less expensive than laminated E-cores 42 and 44 of FIG. 1. Cores 74 and 76 are formed from a magnetically permeable material such as ferrite and have wound thereon primary windings 78 and 80 and secondary windings 82 and 84, respectively. The windings are conveniently held in outer bobbin assemblies 86 and 88. Diaphragm 32 is disposed non-equidistantly between each core 74 and 76 and serves to complete a flux path between the primary and secondary winding of each, as in the embodiment of FIG. 1. Whether spools or laminated E-cores are used, the flat central portion 38 of diaphragm 32 should extend across at least the area encompassed by the cores.

The relationship between the output and input signals of the transducer may be changed by altering the type of diaphragm, the spacing of the diaphragm relative to the windings, the core configuration, the number of core legs about which windings are formed, the density or total number of turns of the windings, or the materials employed in any of the above. For any given phenomenon that can be characterized by a pressure differential which is a non-linear function of the value of the phenomenon, such as airspeed, altitude, and other fields such as the measurement of fluid flow through a conduit, a trial and error approach may be utilized to arrive at an optimum set of dimensions within the given ranges to achieve a linearized output.

While particular embodiments of the invention have been shown and described, numerous additional modifications and variations are possible in light of the above teachings. For example, it would be possible to apply the teachings to capacitive reactance circuitry rather than the inductive reactance circuitry shown. By replacing the magnetically permeable cores with capacitor plates, a flexible diaphragm assymmetrically positioned between the plates could be employed to vary the total capacitance so as to produce a linearized output. It is therefore intended that the scope of the invention be limited only in and by the terms of the appended claims.

What is claimed is:

1. A pressure transducer adapted to produce an output signal that is substantially linear with respect to a phenomenon of interest, said phenomenon being a non-linear function of a pressure differential, comprising:

a housing having an interior chamber, and
   variable electrical reactance circuitry supported by said housing, said circuitry comprising first and second stationary reactance means disposed in mutually spaced opposition in said chamber, input and output terminals associated with said reactance means, and a flexible diaphragm formed from a magnetically permeable material and anchored within said chamber between said reactance means, said diaphragm being reactively coupled to each of said reactance means and spaced therefrom by first and second gaps respectively, the first of said gaps being in the approximate range of 0.25 to 4.0 mm, the second of said gaps being in the approximate range of 0.05 to 0.8 mm, and the ratio of the first to the second gap being at least 2:1, all of the above dimensions taken with the diaphragm unflexed,
   said chamber communicating with the exterior of said housing for reception across said diaphragm of a pressure differential which is representative of the phenomenon of interest,
   said diaphragm adapted to flex and thereby change its reactive coupling with said first and second reactance means in response to changes in said representative pressure differential, the gap dimensions being selected such that the signal at the output terminals varies substantially linearly with variations in the phenomenon of interest when a steady state signal is applied at the input terminals.

2. The pressure transducer of claim 1, wherein said first and second stationary reactance means respectively comprise first and second inductance coil means.

3. The pressure transducer of claim 2, wherein each of said inductance coil means includes a primary and a secondary winding, the primary windings being connected in a series circuit with said input terminals, and the secondary windings being connected in a series circuit with said output terminals.

4. The pressure transducer of claim 3, useful as an airspeed indicator in the approximate range of 180 to 1,100 km per hour, wherein the gaps between said diaphragm and said first and second inductance coils taken with the diaphragm unflexed are approximately 2.5 mm and 0.38 mm, respectively.

5. The pressure transducer of claim 3, useful as an altimeter in the approximate range of 0 to 25 km, the chamber on one side of said diaphragm being sealed and substantially evacuated, the chamber on the other side of said diaphragm communicating with the exterior of said housing for receiving an altitude-representing pressure, wherein the gap between said diaphragm and the inductance coil on the sealed side of said chamber is approximately 1.5 mm, and the gap between said diaphragm and the inductance coil on the other side of said chamber is approximately 0.1 mm, said dimensions being taken with the diaphragm unflexed.

6. The pressure transducer of claim 1, wherein said housing comprises an outer open-ended casing and a pair of plugs lodged in opposed openings of said casing, said diaphragm being supported within said casing between said plugs, one of said plugs carrying the first of said stationary reactance means, and the other of said plugs carrying the second of said stationary reactance means, said plugs being selectively positioned in said casing to determine the desired gap distances between said diaphragm and said stationary reactance means.

7. The pressure transducer of claim 6, wherein said casing includes first and second sockets for receiving said plugs, each of said sockets having an outward facing floor portion, and further including at least one shim lodged between each socket floor and its corresponding plug to position said plugs within said sockets relative to said diaphragm.

8. The pressure transducer of claim 1, said chamber including a generally annular wall encircling said reactance circuitry, and said diaphragm being provided with an annular rim portion attached to said chamber wall.

9. The pressure transducer of claim 8, wherein said diaphragm is attached to said annular chamber wall by means of a welded joint.

10. The pressure transducer of claim 9, said annular chamber wall including a ledge disposed generally in the plane of said diaphragm, the rim of said diaphragm being welded to said ledge.

11. The pressure transducer of claim 8, wherein said diaphragm includes a flat, circular central portion encompassing at least the area of said reactance means, and a corrugated portion between said central and rim portions facilitating flexural movement of said central portion.

12. A pressure transducer adapted to produce an output signal that is substantially linear with respect to a phenomenon of interest, said phenomenon being a non-linear function of a pressure differential, comprising:

a housing having an interior chamber,
   first and second inductance means disposed in mutually spaced opposition in said chamber, and adapted to receive an input signal,
   a flexible diaphragm formed from a magnetically permeable material and anchored within said chamber between said inductance means, said diaphragm being magnetically coupled to each of said inductance means and spaced therefrom by first and second gaps respectively, the ratio of the first to the second gap being at least 2:1 with the diaphragm unflexed,
   said chamber communicating with the exterior of said housing for reception across said diaphragm of a pressure differential representing the phenomenon of interest, and
   output means adapted to provide an indication of the instantaneous magnetic coupling between each of said inductance means and said diaphragm, said output means being connected to provide a net transducer output, said diaphragm being adapted to flex and thereby change its magnetic coupling with said first and second inductance means in response to changes in said representative pressure differential, said gap dimensions being selected such that the net transducer output varies substantially linearly with variations in the phenomenon of interest when a steady state input signal is applied to said inductance means.

13. The pressure transducer of claim 12, wherein the size of one of said gaps is in the approximate range of from 0.25 mm to 4.0 mm, and the size of the other of said gaps is in the approximate range of from 0.05 mm to 0.8 mm, said dimensions taken with the diaphragm unflexed.

14. The pressure transducer of claim 12, wherein the output means of each of said inductance means are connected in a series circuit to produce a net transducer output which is the sum of the output of each inductance means.

* * * * *